United States Patent [19]

Carlson et al.

[11] Patent Number: 4,491,033
[45] Date of Patent: Jan. 1, 1985

[54] DOUBLE ECCENTRIC WAVE GENERATOR ARRANGEMENT

[75] Inventors: John H. Carlson; Carl F. Peterson, both of Danvers, Mass.

[73] Assignee: USM Corporation, Farmington, Conn.

[21] Appl. No.: 507,015

[22] Filed: Jun. 23, 1983

[51] Int. Cl.³ ............................ F16H 1/28; F16H 33/00
[52] U.S. Cl. ........................................... 74/640; 74/804
[58] Field of Search ................... 74/640, 411, 804, 805

[56] References Cited

U.S. PATENT DOCUMENTS

| | | | |
|---|---|---|---|
| 2,943,465 | 7/1960 | Musser | 74/640 |
| 3,068,719 | 12/1962 | Singelmann | 74/640 |
| 3,161,082 | 12/1964 | Musser | 74/640 |
| 3,187,605 | 6/1965 | Stiff | 74/640 |
| 3,747,434 | 7/1973 | Stahlhuth | 74/804 X |
| 3,996,816 | 12/1976 | Brighton | 74/640 |
| 4,286,476 | 9/1981 | Stiff | 74/640 |

FOREIGN PATENT DOCUMENTS

| | | | |
|---|---|---|---|
| 485259 | 12/1975 | U.S.S.R. | 74/640 |
| 620715 | 7/1978 | U.S.S.R. | 74/640 |
| 929930 | 5/1982 | U.S.S.R. | 74/640 |
| 953295 | 8/1982 | U.S.S.R. | 74/640 |

Primary Examiner—Allan D. Herrmann
Assistant Examiner—Stephen B. Andrews
Attorney, Agent, or Firm—Donald N. Halgren

[57] ABSTRACT

A double eccentric wave generator assembly for a harmonic drive type transmission having a circular spline and a flexible spline coaxially mounted each having matable gear teeth, a deflection means mounted within said flexspline, said deflection means comprising a pair of wave generating discs journalled on eccentric hubs on a sleeve. The discs are non-parallel with one another so as to present an outer periphery which is parallel to the flexspline when it is coned during deflection thereof. A third disc is disposed on the sleeve to provide shape control to the flexspline during rotation thereof.

6 Claims, 2 Drawing Figures

DOUBLE ECCENTRIC WAVE GENERATOR ARRANGEMENT

BACKGROUND OF THE INVENTION (1) Field of the Invention

This invention relates to motion transmitting mechanisms, and more particularly to harmonic drive type transmissions.

(2) Prior Art

In U.S. Pat. No. 3,161,082 to C. W. Musser and assigned to the assignee of the current invention, there is shown a harmonic drive transmission having two wave generator discs each mounted on an eccentric ball bearing on a shaft. A flexspline is rotatively supported in a housing and on an output shaft. The housing has an inwardly directed array of teeth comprising a circular spline and the flexspline has thereon an outwardly directed array of matable teeth thereon, as shown in the aforementioned patent. The eccentric wave generators reduce the mass of the input elements which rotate at input speed, thereby increasing the response time.

As shown in the '082 patent to Musser, the wave generator discs are orthogonal to the axis of rotation of the wave generator shaft. No suggestion is made in these references, regarding the angle of the wave generator disc relative to the angle of the interengaging teeth of the flexspline and the circular spline. There is reference to the coning action of the flexspline when the distal end thereof is deflected from an essentially round condition into its ellipsoidal shape, which helps to reduce backlash. The outer surfaces of the wave generator discs described in this patent have "arcuate surfaces" in the longitudinal direction of their periphery.

U.S. Pat. No. 3,747,434 to P. Stahlhath describes a harmonic drive unit having a pair of wave generator discs, mounted parallel to one another and whose axes are coincident, both being mounted on a skewed bearing, so that the portion of tooth engagement generated by each respective disc lies in a common plane. The discs have arcuate outer surfaces in longitudinal cross-section.

The prior art does not minimize bearing wear, nor do any of the peripheral surfaces of the wave generator discs properly conform to the bore of the flexspline along the major axis when the optimum deflection shape is imposed upon the flexspline, to minimize its stress and therefore, maximize its life. The reference to Stahlhath mentions that asymmetrical loading and imbalance are reduced, but they do not say that the imbalance would be eliminated. Further, one of the wave generator discs tends to more nearly conform to the flexspline bore along one side of the major axis while the disc on the opposite side is skewed in a negative direction relative to the cone angle of the flexspline.

Thus it is an object of the present invention to provide a double eccentric wave generator arrangement for a harmonic drive type transmission which overcomes the disadvantages of the prior art.

BRIEF SUMMARY OF THE INVENTION

A double eccentric wave generator in a harmonic drive transmission, where a pair of wave generators are mounted eccentrically on a shaft, to induce a deflection wave in a flexspline, to effectuate engagement of its teeth with those of a circular spline, the wave generators comprising discs which are arranged obliquely with respect to one another, and essentially orthogonal to their adjacent portion of the flexspline bore along its major axis.

Each of the wave generator discs is mated with a bearing secured to an eccentric portion of a hub disposed about the shaft. The eccentric portion of the hub for each wave generator is skewed, with respect to the angle of rotations of the shaft by an amount approximately equal to the cone angle of the flexspline across its major axis. Thus the outer periphery of the wave generator discs are parallel to and flush against an inner surface of the flexspline on which they roll. Under this condition there is no moment imposed upon the wave generator discs, and no strain is placed on the inner race of the bearing, with respect to the outer race due to a twisting moment.

An additional disc may be arranged on the hub, about a concentric portion thereof, with respect to the axis of rotation of the shaft. The diameter of this additional disc being the size of the minor axis of the flexspline in the plane in which it contacts the flexspline bore. Its function is to minimize the inward movement of the flexspline along the minor axis due to applied output torque, thereby minimizing any torsional windup.

The hub on which the bearings are disposed is of hollow cylindrical configuration, and is disposed on the shaft and pinned thereto at its non eccentric end, across the minor axis orientation of the wave generator discs, the shaft being undercut along the length of the hub, except at its circumferential location where the pin is arranged. The undercut provides a clearance, permitting a limited movement of the hub with respect to the shaft, which would compensate for any misalignment therebetween.

BRIEF DESCRIPTION OF THE DRAWINGS

The objects and advantages of the present invention will become more apparent when viewed in conjunction with the following drawings in which.

DESCRIPTION OF THE RPEFERRED EMBODIMENT

Figure 1:
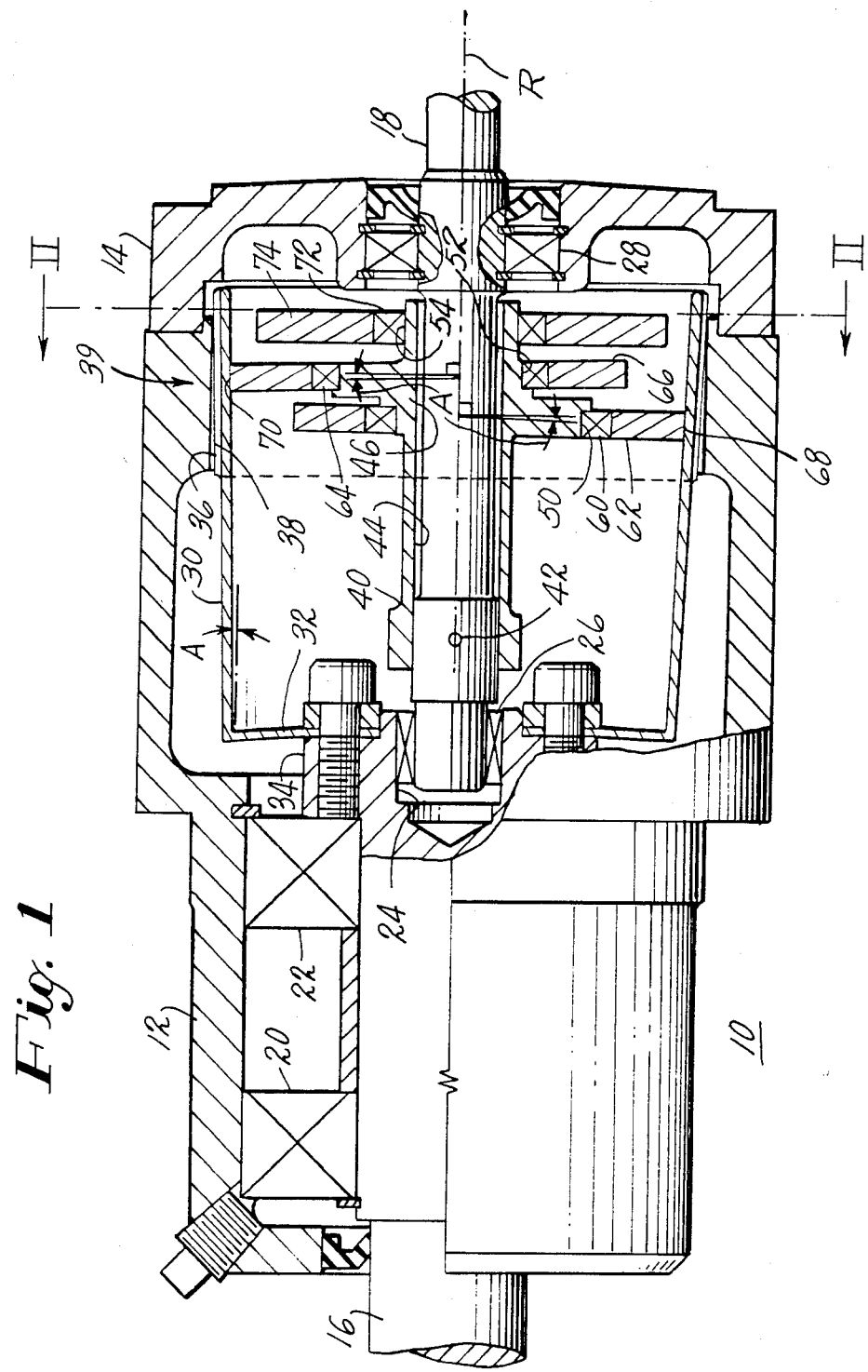
FIG. 1 is a side elevational view taken in a longitudinal section, of a transmission constructed according to the principles of the present invention.

Referring now to the drawings in detail, and particularly to FIG. 1, there is shown a harmonic drive type transmission 10, comprising a housing 12 and an end cap 14, with an output shaft 16 and an input shaft 18 extending therethrough. A pair of bearings 20 and 22 support the output shaft 16 within the housing 12. The inner end of the output shaft 16 has an opening 24 in which an innermost bearing 26 is arranged to rotatively support the inner end of the input shaft 18. A second bearing 28 is disposed about the input shaft 18 in the end cap 14. A flexspline 30 has a diaphragm 32 which is secured to an annular flange 34 on the inner end of the output shaft 16. The flexspline 30 shown coned, by an angle A across its major axis, has an annular array of external gear teeth 36 near its periphery, which mate with an annular array of internal gear teeth 38 comprising a circular spline 39 arranged with the housing 12, the teeth 36 and 38 engaging in the known harmonic drive manner.

A hollow cylindrically shaped sleeve 40 is disposed about the input shaft 18 and is pivotably attached thereto by a pin 42, arranged diametrically across the sleeve 40 and the input shaft 18. The input shaft 18 has an undercut portion, that is, a longitudinal segment 44 of reduced diameter as compared to the diameter of the input shaft 18 where it is joined to the sleeve 40. The sleeve 40 has an outer end 46 at which a plurality of hubs 50, 52 and 54 arranged thereon, either by a press fit, or from a common manufacture. The first hub 50, is eccentrically arranged with respect to the axis of rotation "R" of the sleeve 40, and is skewed at an angle A with respect to the axis of rotation "R" of the sleeve 40 by an amount equal to the cone angle A in the flexspline along the major axis. This angle of skewness is dependent upon the amount of deflection imposed in the flexspline by the wave generator discs and the length to diameter ratio of the flexspline. That is, the cone angle A is that angle by which the walls of the flexspline, at its major axis, differs from the axis of rotation R. Typically, the angle of skewness is between about $\frac{1}{4}°$ for low deflection, i.e. high ratio, up to about 1° for high deflection, i.e. low ratio.

A first standard bearing 60 may be arranged on the first eccentric hub 50, and a first wave generator disc 62 is mated about the first standard bearing 60. The second hub 52 is contiguous to the first hub 50 on the sleeve 40 and also is eccentric by the same angle A with respect to the axis of rotation "R". The eccentricity of the second hub 52 is 180° out-of-phase with respect to the first hub 50 since there are two eccentric wave generator discs utilized in this embodiment. If these wave generators were utilized in a three lobed unit, they should be arranged 120° out-of-phase on the sleeve 40. A second standard bearing 64 is mated about the second hub 52, and a second wave generator disc 66 is mated about the second standard bearing 64.

The first and second wave generators 62 and 66 in this embodiment are of circular configuration and are of the same diameter, each having an outer periphery 68 and 70 respectively which are parallel to their particular segment of the flexspline in its coned configuration along the major axis, as shown in FIG. 1. The combined eccentricities of the first and second wave generator discs 62 and 66 define the major axis across their respective diametrically opposed points of contact on the inner surface of the flexspline 30.

Figure 2:
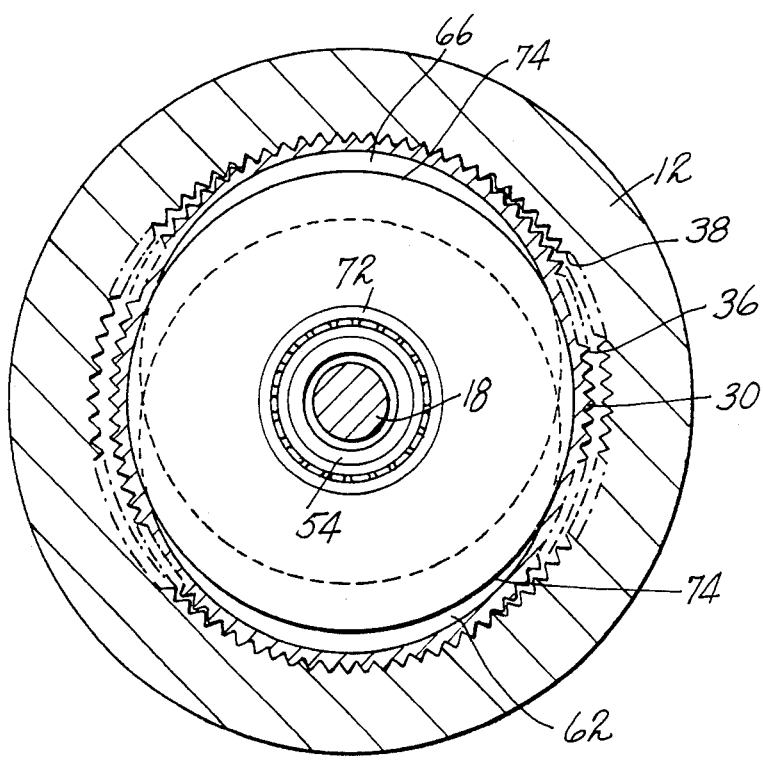
FIG. 2 is a section taken along the lines II—II of FIG. 1.

The third hub 54 is concentric with respect to the axis of rotation "R" of the sleeve 40 and the input shaft 18 as shown in FIG. 2. A third standard bearing 72 is mounted thereon, with a shape control disc 74 pressed thereabout. The shape control disc 74 is circular and is essentially equal in diameter to the minor axis in the flexspline bore.

Rotation of the input shaft 18 effectuates rotation of the sleeve 40 and its eccentric hubs 50 and 52 and the concentric hub 54, causing a sweeping of each eccentric hub 50 and 52 making their respective wave generators 62 and 66 journaled thereon to roll against the inner surface of the flexspline 30, engaging segments of the external flexspline teeth 36 with segments of the internal teeth 38 of the circular spline 39, effectuating counter rotation thereof in the known harmonic drive manner.

The eccentricity of the hubs 50 and 52 permit standard bearings to be utilized with the wave generator discs 62 and 66 because their outer peripheral surfaces 68 and 70 are parallel to the cone angle of the flexspline 30 at their locus of enmeshment with the circular spline 39, causing no transverse moment about their bearings 60 and 64.

Thus there has been shown a unique double eccentric harmonic drive transmission which utilizes an eccentric hub arrangement to activate a set of non-parallel wave generating discs into orbiting motion against the inside of a flexspline, permitting alignment of those non-parallel wave generating discs with their contiguous inner surfaces of the coned flexspline.

We claim:

1. A strain wave gearing assembly having a toothed circular spline and a toothed flexspline, having deflection means therewithin so as to effectuate progressive engagement of said circular spline and said flexspline, said deflection means comprising:

first wave generation disc journaled on a rotatable sleeve within said flexspline;

a second wave generator disc journaled on said disc; said first and second wave generating discs being non-paralleled with respect to one another and orthogonal with said flexspline at their contacting surfaces.

2. A harmonic drive transmission as recited in claim 1, wherein each of said wave generation discs are mounted on a hub on said sleeve.

3. A harmonic drive transmission as recited in claim 2, wherein each of said hubs is eccentrically disposed on said sleeve with respect to the axis of rotation of said sleeve.

4. A harmonic drive transmission as recited in claim 2, wherein said wave generation discs are mounted at an angle which ranges from about $\frac{1}{4}°$ to about 1° from orthogonal with said axis of rotation of said shaft.

5. A harmonic drive transmission as recited in claim 3, wherein said sleeve is mounted on a shaft, said sleeve being pivotably secured to said shaft at one end thereof by a pin diametrically disposed therebetween, said shaft being of reduced diameter from said pinned location, to permit slight motion within said sleeve.

6. A harmonic drive transmission as recited in claim 3, including a third disc mounted on a hub on said sleeve, said third disc being concentric with respect to said axis of rotation of said sleeve, said third disc controlling the shape of said flexspline.

* * * * *